(12) United States Patent
Schuffenhauer

(10) Patent No.: US 10,189,090 B2
(45) Date of Patent: Jan. 29, 2019

(54) DRILLING TOOL

(71) Applicant: Kennametal Inc., Latrobe, PA (US)

(72) Inventor: Michael Schuffenhauer, Fürth (DE)

(73) Assignee: KENNAMETAL INC., Latrobe, PA (US)

( * ) Notice: Subject to any disclaimer, the term of this patent is extended or adjusted under 35 U.S.C. 154(b) by 0 days.

(21) Appl. No.: 15/460,908

(22) Filed: Mar. 16, 2017

(65) Prior Publication Data

US 2017/0266734 A1 Sep. 21, 2017

(30) Foreign Application Priority Data

Mar. 21, 2016 (DE) .................. 10 2016 105 234

(51) Int. Cl.
*B23B 29/03* (2006.01)
*B23D 77/02* (2006.01)

(52) U.S. Cl.
CPC .............. *B23B 29/03* (2013.01); *B23D 77/02* (2013.01); *B23B 2240/24* (2013.01); *B23B 2250/12* (2013.01); *B23B 2260/124* (2013.01); *B23D 2277/02* (2013.01)

(58) Field of Classification Search
CPC . B23B 2240/00; B23B 2240/24; B23B 31/40; B23B 31/4006; B23B 31/117; B23B 29/03; B23B 2251/02; B23D 2277/02
See application file for complete search history.

(56) References Cited

U.S. PATENT DOCUMENTS

| | | | | |
|---|---|---|---|---|
| 1,472,565 A | * | 10/1923 | Manning | B23C 5/26 279/2.04 |
| 1,797,296 A | * | 3/1931 | Ray | A43D 87/00 12/91 |
| 2,303,487 A | * | 12/1942 | Miller | B23D 77/00 408/200 |
| 2,911,019 A | * | 11/1959 | Bailey, Jr. | B27G 13/12 144/136.1 |
| 2,912,904 A | * | 11/1959 | Peterson | B23C 5/26 403/240 |
| 2,995,963 A | * | 8/1961 | Lavallee | B23D 77/00 408/233 |
| 3,643,546 A | * | 2/1972 | Richter | B23Q 17/0976 279/129 |

(Continued)

FOREIGN PATENT DOCUMENTS

| | | | | |
|---|---|---|---|---|
| CN | 2758740 Y | 2/2006 | | |
| DE | 19600239 C1 | * 4/1997 | ......... | B23B 31/1107 |

(Continued)

OTHER PUBLICATIONS

Machine translation of JP 2012-179685, printed Apr. 2018.*
Machine translation of JP 07-040141, printed Apr. 2018.*

*Primary Examiner* — Daniel Howell
(74) *Attorney, Agent, or Firm* — Ian K. Samways

(57) ABSTRACT

A drilling tool with: a shaft; a seat at one end of the shaft; a drill bit, which is arranged on the seat; and a clamping section, which is provided on the shaft and can interact with the drill bit. Also provided is a tensioning screw, which is screwed into the shaft and comprises an expanding section as well as a contact section. The expanding section interacts with the clamping section, and the contact section interacts with the drill bit.

18 Claims, 3 Drawing Sheets

(56) References Cited

U.S. PATENT DOCUMENTS

| | | | | |
|---|---|---|---|---|
| 4,705,435 A | * | 11/1987 | Christoffel | B23D 77/006 |
| | | | | 407/11 |
| 4,843,709 A | * | 7/1989 | Ide | B23B 31/20 |
| | | | | 29/525 |
| 6,575,672 B1 | * | 6/2003 | Maier | B23D 77/006 |
| | | | | 408/171 |
| 8,123,442 B2 | * | 2/2012 | Paul | B23D 77/006 |
| | | | | 408/153 |

FOREIGN PATENT DOCUMENTS

| | | | | | |
|---|---|---|---|---|---|
| FR | 2020138 A1 | * | 7/1970 | | B23B 27/007 |
| GB | 2010708 A | * | 7/1979 | | B23B 51/02 |
| JP | 07040141 A | * | 2/1995 | | B23B 31/11 |
| JP | 2012179685 A | * | 9/2012 | | |

* cited by examiner

DRILLING TOOL

CROSS-REFERENCE TO RELATED APPLICATION

This patent application claims priority under 35 U.S.C. § 119(a) to German Patent Application No. DE 10 2016 105 234.5, filed on Mar. 21, 2016, which is incorporated herein by reference in its entirety.

BACKGROUND

The invention generally relates to a drilling tool, and in particular to a tool for the fine machining of bores. This can be a multi-blade reaming tool, a reamer, a fine boring tool, etc.

Generally known is the concept of mounting a drill bit on a shaft, with the drill bit being used for machining. The drilling tool can comprise hardened steel, hard metal, or sintered ceramic. The drill bit is exchangeable (or interchangeable) so that it can be replaced with a new drill bit when worn.

However, there are contradictory requirements imposed on the connection between the drill bit and the shaft. On the one hand, the drill bit is meant to be exchangeable with little effort. On the other hand, the drill bit is meant to be mounted on the shaft with a high degree of precision, to permit machining with low tolerances.

SUMMARY

A task of the invention involves creating a drilling tool that satisfies the contradictory requirements noted above.

In order to solve this task, a drilling tool is provided (according to the present invention) with: a shaft; a seat at one end of the shaft; a drill bit, which is arranged on the seat; a clamping section, which is provided on the shaft and can interact with the drill bit; and a tensioning screw, which is screwed into the shaft and comprises an expanding section as well as a contact section, wherein the expanding section interacts with the clamping section and the contact section interacts with the drill bit. According to the present invention, two manners of fixing the drill bit are combined in this design. Via the clamping section, the drill bit is positioned precisely with high accuracy on the shaft. Via the contact section, the drill bit is mechanically secured in the axial direction on the shaft with little effort.

In an embodiment of the invention, the clamping section comprises a circular cylindrical outer surface, which engages with the drill bit in the radial direction. As a result of the circular cylindrical outer surface, the drill bit can be pushed onto the clamping section with little effort.

Preferably, the clamping section comprises a frustoconical inner surface, which expands toward the axial end of the shaft. In such a design, the clamping section has high stiffness at its end located further inwardly, and yet can be deformed more easily toward its axial end. This results in precise radial fixing combined with a good clamping effect.

Preferably, the expanding section of the tensioning screw is configured to be frustoconical, complementary to the inner surface of the clamping section. As a result, the tensioning screw can easily be screwed into the clamping section and expanded evenly, so that the drill bit is reliably clamped.

One embodiment of the invention provides that the contact section is configured as a circumferential collar. This collar protrudes beyond the expanding section in the radial direction so that it secures the drill bit in the axial direction, when the tensioning screw is screwed into the shaft.

The drill bit is preferably provided with a circular recess, in which the contact section of the tensioning screw comes to rest. The recess, in this respect, is preferably deeper than the thickness of the contact section so that the tensioning screw can come to rest in a protected manner within the recess of the drill bit.

According to one embodiment, the drill bit is provided with an entraining element (or carrying/carrier element), which interacts with an entraining element (or carrying/carrier element) on the shaft. The entraining element ensures a positive connection between the drill bit and the shaft so that even high torques can be reliably transferred from the shaft to the drill bit.

The entraining element can be a protrusion on the drill bit, wherein such a protrusion extends in the axial direction and engages with a recess in the seat of the shaft. An entraining element such as this can be produced with little effort.

The drill bit preferably has a generally annular shape. This allows for the drill bit to be placed onto the front end of the shaft, where it is automatically centered on its seat.

According to one embodiment of the invention, a coolant bore extends through the shaft and through the tensioning screw. This allows for supplying a coolant with little effort.

BRIEF DESCRIPTION OF THE DRAWINGS

The invention will be explained below with reference to an embodiment that is portrayed in the accompanying drawings. They depict the following.

DETAILED DESCRIPTION

Figure 1:
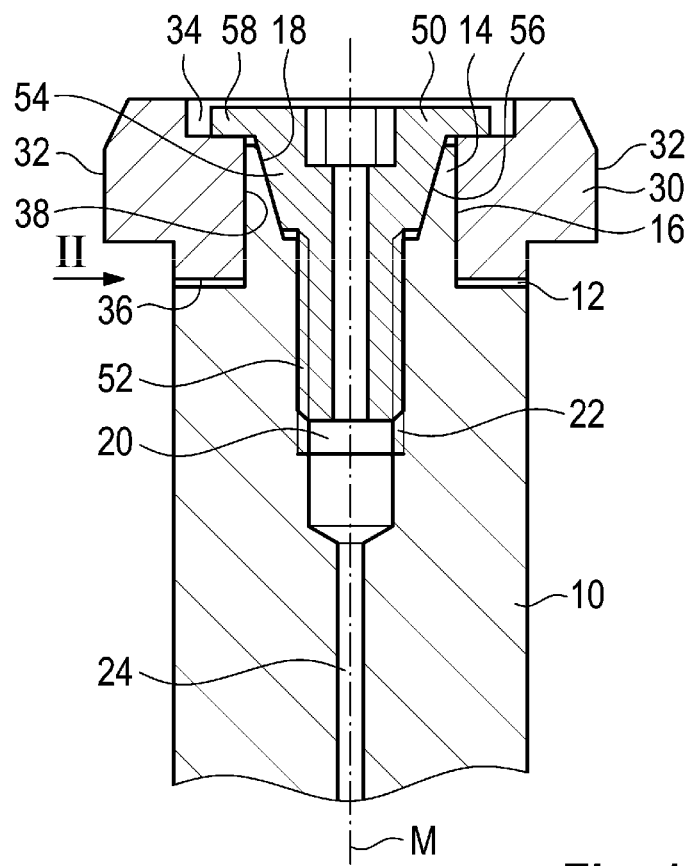
FIG. 1 is a schematic sectional view of a drilling tool according to the present invention, in accordance with a first embodiment.

FIG. 1 shows a shaft 10, which is configured to be generally cylindrical with a center axis M. At its bottom end with respect to FIG. 1 (which is a truncated view here), the shaft 10 is clamped into a machine tool in a typical fashion.

At the opposite end (i.e., the upper end of FIG. 1), the shaft 10 is provided with a seat 12 for a drill bit (described further below). The seat 12 in this case is an annular surface, which is arranged concentrically with respect to the center axis M of the shaft 10.

The seat 12 is connected to a clamping section 14, which itself comprises a circular cylindrical outer surface 16. This outer surface is also arranged concentrically with respect to the center axis M of the shaft 10.

The seat 12 and the outer surface 16 of the clamping section 14 define a shoulder on the front end of the shaft 10.

Internally, the clamping section 14 is provided with a frustoconical inner surface 18. In this case, the larger base of the truncated cone is located on the outside of the shaft 10. Put another way, the inner surface 18 expands toward the end of the shaft 10.

Starting from the internal end of the inner surface 18 of the clamping section 14, a bore 20—which itself is provided with an internal thread 22—extends into the shaft 10. The bore 20 is arranged concentrically with respect to the center axis M.

From the bore 20, a coolant bore 24 connects inwardly into the shaft 10. This coolant bore has a smaller diameter than the bore 20.

At the upper end of the shaft 10 as shown in FIG. 1, there is a drill bit 30 which is configured to be generally annular. Drill bit 30 includes several cutting edges 32 at its circumferential surface (only shown here schematically), via which a workpiece can be machined. The drill bit 30 is in particular used for fine boring.

At an end surface, the drill bit 30 is provided with a circular recess 34. This recess is arranged concentrically with respect to the center axis M of the shaft 10. Axis M also then becomes the center axis of the drill bit 30, when the drill bit 30 is mounted on the shaft 10.

At its side facing away from the recess 34, the drill bit 30 is provided with an annular seat surface 36, which abuts against the seat 12.

At its inner surface, the drill bit 30 is provided with a cylindrical surface 38, the inner diameter of which corresponds to the outer diameter of the outer surface 16 of the clamping section 14.

The dimensions of the cylindrical surface 38 and the outer surface 16 of the clamping section 14 are adapted to one another such that the drill bit 30 can be pushed onto the clamping section 14 by hand, but with a minimum amount of play.

Figure 2:
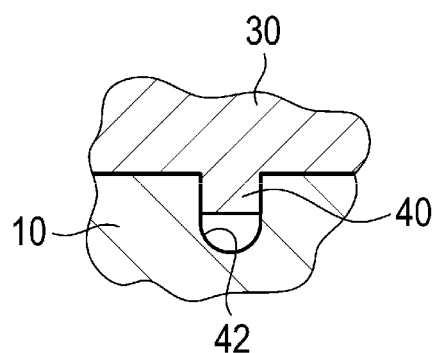
FIG. 2 is a detailed view in the direction II from FIG. 1.

In a circumferential direction, the drill bit 30 is secured on the shaft 10 in a form-fitting manner. For this purpose, an entraining element is provided, which can be seen in FIG. 2. The entraining element is formed by a protrusion 40, which protrudes in the axial direction from the seat surface 36 of the drill bit 30 and engages with a complementary recess 42, itself provided in the seat 12 of the shaft 10.

An entraining element can be provided several times, at uniform angular distances from one another about the center axis M.

A tensioning screw 50 is screwed into the bore 20. The tensioning screw 50 comprises an external thread 52, which engages with the internal thread 22. In the region of the screw head, the tensioning screw 50 is provided with an expanding section 54, which comprises a frustoconical expanding surface 56. The dimensions of the expanding surface 56 are configured to be complementary to the dimensions of the inner surface 18 of the clamping section 14.

The expanding surface 56 is connected to a contact surface 58, by way of which the tensioning screw 50 engages with the drill bit 30 in the axial direction and pushes the same firmly against the seat 12. The contact section 58 in this case is configured as a circumferentially extending collar.

The height of the collar 58 is slightly less than the depth of the recess 34, so that the tensioning screw 50 does not protrude beyond the drill bit 30 in the axial direction.

The dimensions of the contact section 58, the expanding section 54, and the clamping section 14, as well as those of the drill bit 30, are adapted to one another such that, with the tensioning screw 50 being screwed into the bore 20, a radial clamping effect of the clamping section 14 takes place simultaneously with an axial tensioning effect on the drill bit 30. In this manner, there is an assurance that the drill bit 30 will be fixed precisely on the front end of the shaft 10 with low tolerances. At the same time, there is an assurance that the drill bit 30 is reliably secured in the axial direction.

The tensioning screw 50 includes a coolant bore, which runs centrally and which serves to continue the coolant bore 24 in the shaft 10.

Figure 3:
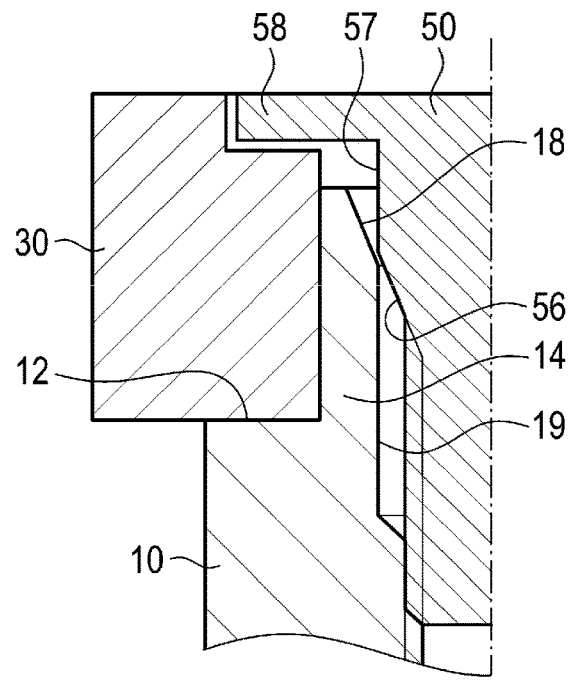
FIG. 3 provides, in a truncated view, a drilling tool according to a second embodiment in a first condition.
Figure 4:
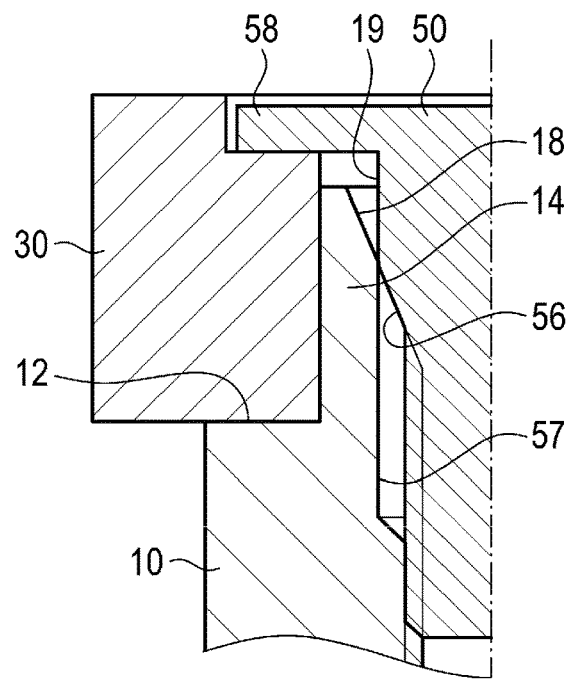
FIG. 4 provides, in a view similar to that of FIG. 3, a drilling tool according to a second embodiment in a second condition.
Figure 5:
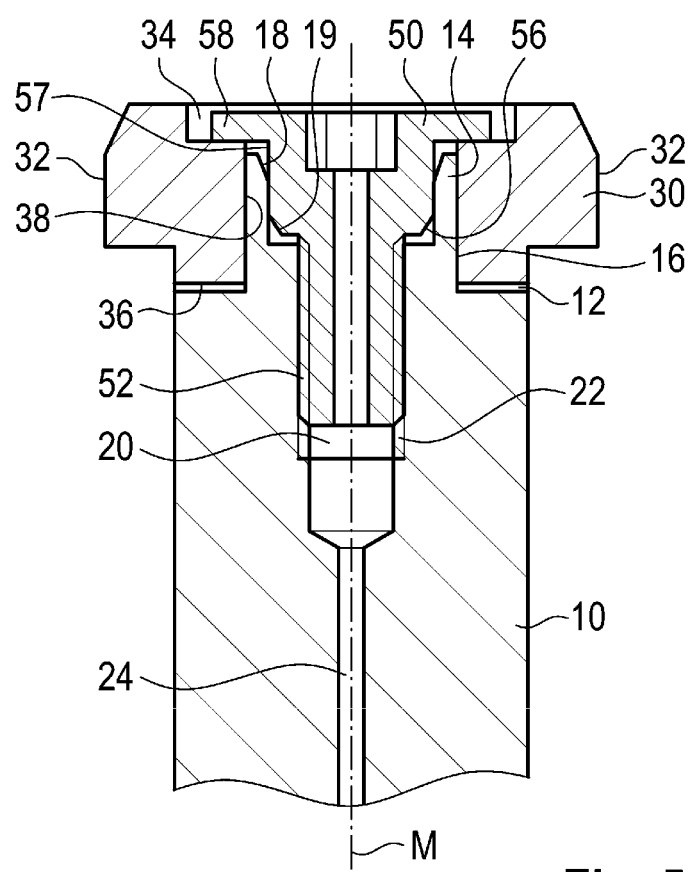
FIG. 5 provides, in a view similar to that of FIG. 1, a drilling tool according to the second embodiment.

FIGS. 3 to 5 show a second embodiment. For the components already described with respect to the first embodiment, the same reference symbols are used, and reference is made in that respect to the explanations above.

A difference between the first and the second embodiment resides in each frustoconical surface 18, 56 being assigned to a circular cylindrical contact surface in the second embodiment.

On the side of the clamping section 14, a circular cylindrical contact surface 19 is provided, which, when viewed in the axial direction, is arranged inwardly of the frustoconical inner surface 18 and directly connects to the same.

On the side of the tensioning screw 50, a circular cylindrical contact surface 57 is provided, which connects to the frustoconical expanding surface 56 on the side facing the contact surface 58.

In the condition shown in FIG. 3, the expanding surface 56 acts in the same way as in the first embodiment. Thus, the tensioning screw is screwed into the shaft 10 until the contact section 58 clamps the drill bit 30 in the axial direction, wherein the radial clamping force increases during the act of screwing in.

If, as a result of tolerances, etc., the tensioning screw 50 can end up being screwed into the shaft 10 beyond a given point, and before the axial tensioning force is sufficiently high, the expanding surface 56 is pushed "past" (or "over") the conical inner surface 18 so that the two circular cylindrical contact surfaces 19, 57 then abut against each other (see FIGS. 4 and 5). This results in the radial clamping force not increasing any further as the tensioning screw 50 is screwed in further.

The maximum acting radial clamping force can, in the manner just described, be structurally determined via dimensioning of the surfaces 18, 56.

The drilling tool described herein offers an array of advantages.

On the one hand, the drill bit 30 can be mounted and clamped securely with little effort. For this purpose, it is only necessary to tighten the tensioning screw 50 with a suitable torque. A high degree of accuracy also results, since the drill bit 30 is guided precisely via the clamping section 14. The seat 12, in combination with the clamping section 14, also ensures that the drill bit 30 is mounted very stiffly on the shaft 10. Because of the entraining element, it also becomes the case that even high torques can be transferred reliably. Finally, because of an overall simple structure, low manufacturing costs also result.

What is claimed is:

1. A drilling tool comprising:
a shaft having a longitudinal axis;
a seat disposed toward an axial end of the shaft;
a drill bit accommodated at the seat;
a clamping section, which is disposed on the shaft and interacts with the drill bit; and
a tensioning element which is disposed in the shaft and is axially displaceable with respect to the shaft, the tensioning element comprising an expanding section and a contact section, the expanding section being connected to the contact section;
wherein the expanding section interacts with the clamping section, and the contact section interacts with the drill bit;
the clamping section comprising a frustoconical inner surface;

the frustoconical inner surface expanding toward an axial end of the shaft;
the expanding section of the tensioning element comprising a frustoconical shape which is complementary to the inner surface of the clamping section.

2. The drilling tool according to claim 1 wherein:
the shaft comprises a bore which accommodates the tensioning element; and
upon axial displacement of the tensioning element with respect to the bore, the clamping section provides a radial clamping effect and an axial clamping effect with respect to the drill bit.

3. The drilling tool according to claim 1, wherein the clamping section comprises a cylindrical outer surface which engages with the drill bit in a radial direction of the shaft.

4. The drilling tool according to claim 3, wherein:
the clamping section comprises a frustoconical inner surface;
wherein the frustoconical inner surface expands toward an axial end of the shaft.

5. The drilling tool according to claim 1, wherein:
the clamping section includes a cylindrical inner surface disposed axially adjacent to the frustoconical inner surface; and
the tensioning element includes a cylindrical outer surface disposed axially adjacent to the frustoconical shape of the expanding section.

6. The drilling tool according to claim 5, wherein, upon axial displacement of the tensioning element with respect to the bore, the frustoconical shape of the expanding section clamping section is displaced past the frustoconical inner surface of the clamping section such that the cylindrical outer surface of the tensioning element abuts the cylindrical inner surface of the clamping section.

7. The drilling tool according to claim 1, wherein the contact section is configured as a circumferentially extending collar.

8. The drilling tool according to claim 7, wherein the circumferentially extending collar protrudes radially away from an axial end portion of the expanding section.

9. The drilling tool according to claim 8, wherein the circumferentially extending collar is generally circular in cross-sectional shape.

10. The drilling tool according to claim 1, wherein the drill bit includes a recess, within which the contact section comes to rest.

11. The drilling tool according to claim 10, wherein the recess is generally circular in cross-sectional shape.

12. The drilling tool according to claim 10, wherein the recess has an axial depth dimension which is greater than an axial thickness dimension of the contact section.

13. The drilling tool according to claim 1, wherein:
the drill bit comprises a first entraining element; and
the shaft comprises a second entraining element;
wherein the first entraining element interacts with the second entraining element in a form-fitting manner.

14. The drilling tool according to claim 13, wherein:
the first entraining element comprises a protrusion of the drill bit and extends in an axial direction; and
the second entraining element comprises a recess in the seat of the shaft;
wherein the protrusion engages with the recess.

15. The drilling tool according to claim 1, wherein the drill bit has a generally annular shape.

16. The drilling tool according to claim 1, comprising a coolant bore extending through the shaft and a coolant bore extending through the tensioning element, wherein the coolant bore of the shaft and the coolant bore of the tensioning element are in fluid communication with one another.

17. The drilling tool according to claim 1, wherein the tensioning element comprises a tensioning screw which is screwed into the shaft.

18. A drilling tool comprising:
a shaft having a longitudinal axis;
a seat disposed toward an axial end of the shaft;
a drill bit accommodated at the seat;
a clamping section, which is disposed on the shaft and interacts with the drill bit; and
a tensioning element, which is disposed in the shaft and comprises an expanding section and a contact section;
wherein the expanding section interacts with the clamping section, and the contact section interacts with the drill bit;
the clamping section comprises a frustoconical inner surface;
wherein the frustoconical inner surface expands toward an axial end of the shaft;
the expanding section of the tensioning element comprises a frustoconical shape which is complementary to the inner surface of the clamping section;
the clamping section includes a cylindrical inner surface disposed axially adjacent to the frustoconical inner surface; and
the tensioning element includes a cylindrical outer surface disposed axially adjacent to the frustoconical shape of the expanding section;
wherein, upon axial displacement of the tensioning element with respect to the bore, the frustoconical shape of the expanding section clamping section is displaced past the frustoconical inner surface of the clamping section such that the cylindrical outer surface of the tensioning element abuts the cylindrical inner surface of the clamping section.

\* \* \* \* \*